(12) United States Patent
Cho et al.

(10) Patent No.: US 11,144,096 B2
(45) Date of Patent: Oct. 12, 2021

(54) HOUSING MEMBER AND FLEXIBLE DISPLAY DEVICE INCLUDING THE SAME

(71) Applicant: Samsung Display Co., LTD., Yongin-si (KR)

(72) Inventors: Sun Haeng Cho, Yongin-si (KR); Hyo Yul Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/868,151

(22) Filed: May 6, 2020

(65) Prior Publication Data

US 2020/0379515 A1     Dec. 3, 2020

(30) Foreign Application Priority Data

May 29, 2019   (KR) .................. 10-2019-0063427

(51) Int. Cl.
*G06F 1/16*    (2006.01)

(52) U.S. Cl.
CPC .......... *G06F 1/1652* (2013.01); *G06F 1/1616* (2013.01); *G06F 1/1626* (2013.01)

(58) Field of Classification Search
CPC .... G06F 1/1652; G06F 1/1626; G06F 1/1616; G06F 1/1679; G06F 1/1681; G06F 1/1654; G09F 9/301; H01R 13/6205; H01R 11/30
See application file for complete search history.

(56) References Cited

U.S. PATENT DOCUMENTS

| | | | | |
|---|---|---|---|---|
| 6,366,440 B1* | 4/2002 | Kung | ...................... | E05C 19/16 361/147 |
| 8,576,031 B2* | 11/2013 | Lauder | ................. | G06F 1/1626 335/219 |
| 9,696,752 B2* | 7/2017 | Stryker | ................. | G06F 1/1654 |
| 10,050,378 B2* | 8/2018 | Szeto | ................... | H04B 5/0031 |
| 10,303,213 B2* | 5/2019 | Shaw | ................ | H01R 13/6315 |
| 10,564,677 B2* | 2/2020 | Lee | ........................ | G06F 1/1675 |
| 2007/0138806 A1* | 6/2007 | Ligtenberg | ........... | H05K 5/0221 292/251.5 |

(Continued)

FOREIGN PATENT DOCUMENTS

| | | |
|---|---|---|
| KR | 10-1801357 | 12/2017 |
| KR | 10-2018-0121256 | 11/2018 |

(Continued)

*Primary Examiner* — Abhishek M Rathod
(74) *Attorney, Agent, or Firm* — Kile Park Reed & Houtteman PLLC

(57) ABSTRACT

A housing member and a flexible display device including the same are provided. A display panel includes a bending portion and non-bending portions provided on both sides of the bending portion; a body portion disposed under the display panel and includes a first frame and a second frame opposite to each other; and a connection portion connecting the first frame and the second frame to each other and defining a bending axis, the first frame and the second frame include facing surfaces including magnetic areas and a nonmagnetic area, the magnetic areas are spaced apart from each other by the nonmagnetic area, and two magnetic areas of the magnetic areas are disposed in the first frame and the second frame, respectively, and face each other, and have opposite polarities that attract the two magnetic areas.

22 Claims, 12 Drawing Sheets

(56) References Cited

U.S. PATENT DOCUMENTS

| | | | |
|---|---|---|---|
| 2010/0238620 A1* | 9/2010 | Fish | G06F 1/1681 |
| | | | 361/679.09 |
| 2012/0069503 A1* | 3/2012 | Lauder | G06T 1/00 |
| | | | 361/679.01 |
| 2012/0295451 A1* | 11/2012 | Hyun-Jun | H01R 13/6205 |
| | | | 439/39 |
| 2014/0065846 A1* | 3/2014 | Poh | H01R 11/30 |
| | | | 439/39 |
| 2014/0177162 A1* | 6/2014 | Ho | G06F 1/1616 |
| | | | 361/679.43 |
| 2014/0211445 A1* | 7/2014 | Hirai | G06F 1/1654 |
| | | | 361/809 |
| 2016/0111815 A1* | 4/2016 | Szeto | G06F 1/1626 |
| | | | 439/39 |
| 2017/0017273 A1* | 1/2017 | Weldon | G06F 1/1681 |
| 2017/0179641 A1* | 6/2017 | Shi | H01R 12/73 |
| 2017/0220077 A1* | 8/2017 | Holung | G06F 1/1681 |
| 2018/0196479 A1* | 7/2018 | Li | F16C 11/103 |
| 2018/0335800 A1* | 11/2018 | Kim | G06F 1/1681 |

FOREIGN PATENT DOCUMENTS

| | | |
|---|---|---|
| KR | 10-2018-0127757 | 11/2018 |
| KR | 10-2018-0131143 | 12/2018 |
| KR | 10-2019-0003257 | 1/2019 |

* cited by examiner

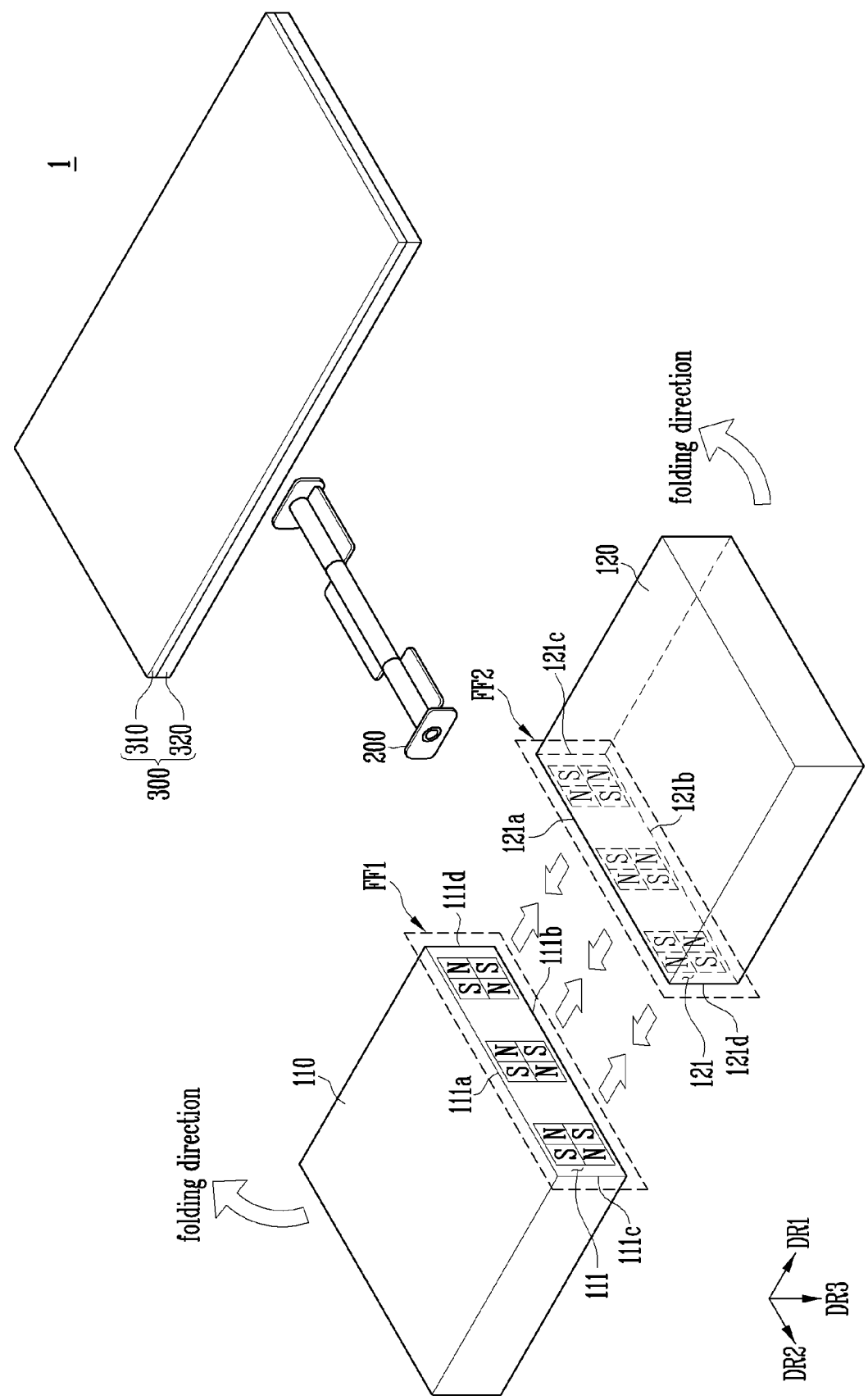

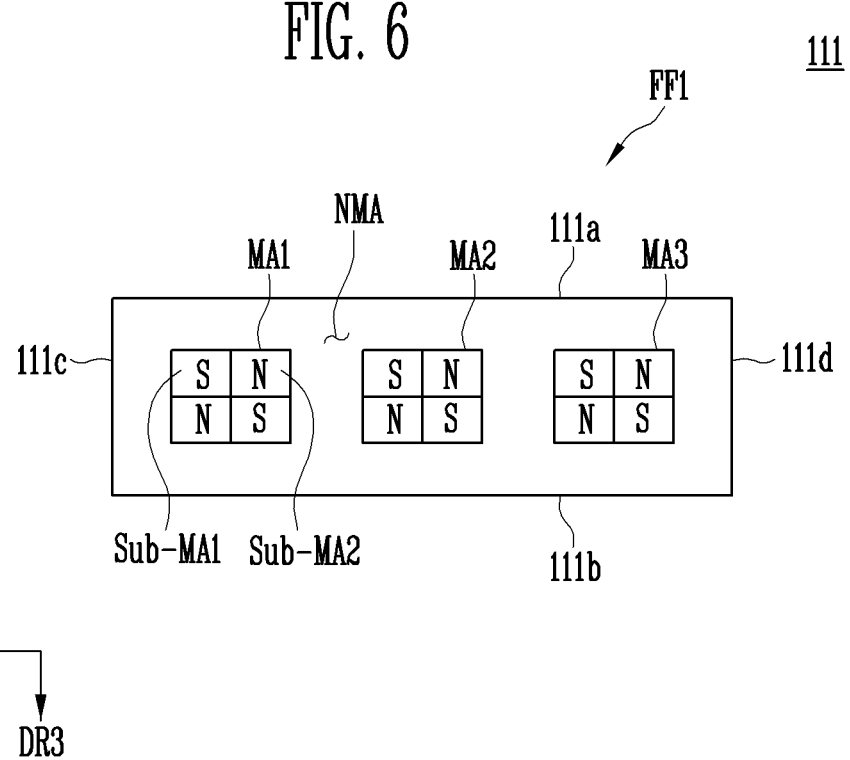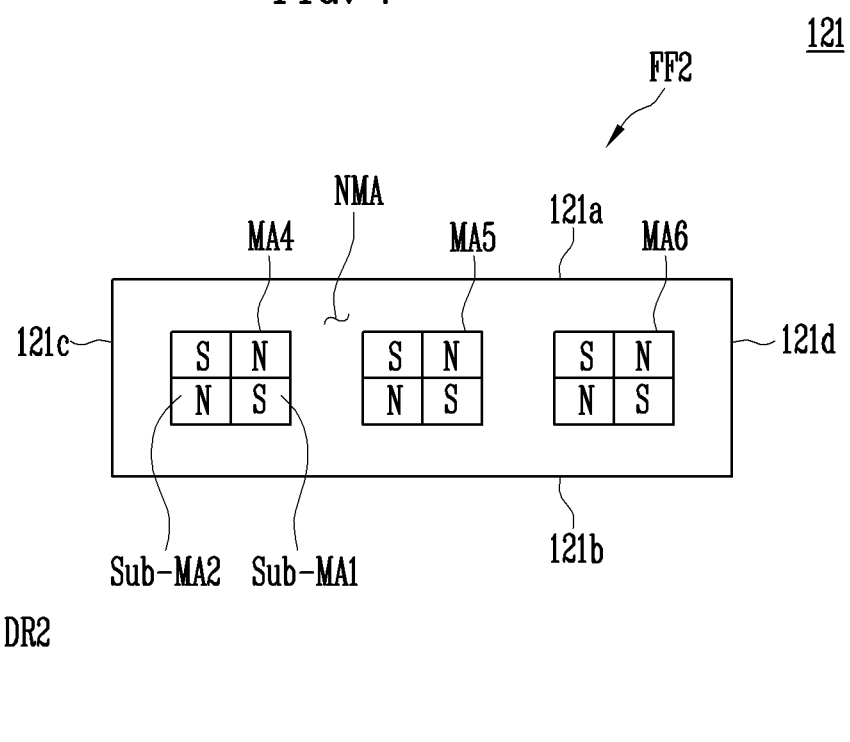

HOUSING MEMBER AND FLEXIBLE DISPLAY DEVICE INCLUDING THE SAME

CROSS REFERENCE TO RELATED APPLICATION(S)

This application claims priority to and benefits of Korean Patent Application No. 10-2019-0063427 under 35 U.S.C. § 119, filed in the Korean Intellectual Property Office on May 29, 2019, the entire contents of which are incorporated herein by reference.

BACKGROUND

1. Technical Field

The disclosure relates to a flexible display device on which a housing member is mounted.

2. Description of the Related Art

An electronic device such as a smart phone, a digital camera, a notebook computer, a navigation system, and a smart television, which displays an image to a user, includes a display device for displaying the image. The display device generates the image on a display screen and the image is visible to the user.

In recent years, various types of display devices have been developed to meet consumer demands. For example, a flexible display device that is deformed into a curved surface shape, folded or curled has been developed. The flexible display device of which a shape may be variously deformed is easy to carry, and may improve user convenience.

Such a flexible display device may be applied to various types of devices such as a television and a monitor as well as a portable electronic device such as a mobile communication terminal, an electronic notebook, an electronic book, a portable multimedia player ("PMP"), a navigation system, an ultra mobile PC (UMPC), a mobile phone, a smart phone, and a tablet personal computer ("PC").

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein

SUMMARY

A problem to be solved is to provide separated housing members that are automatically aligned at a designated position.

Another problem to be solved is to provide a flexible display device on which a display panel with an improved degree of bending deformation is mounted.

The above noted problems to be solved are not limited to the above-described problems, and other technical problems which are not described may be clearly understood and appreciated by those skilled in the art from the following description.

A housing member according to an embodiment of the disclosure for resolving the above-described problems may include a first frame having a first side surface, and a second frame having a second side surface disposed to face the first side surface of the first frame. Each of the first side surface and the second side surface may include a plurality of magnetic areas, and a nonmagnetic area that separates the magnetic areas, at least one magnetic area of the plurality of magnetic areas includes a first sub magnetic area having a first polarity and a second sub magnetic area having a second polarity different from the first polarity, the first sub magnetic area and the second sub magnetic area are in the form of a matrix and alternately disposed in a row direction and a column direction crossing the row direction, and each of the first side surface and the second side surface includes another magnetic area between the matrix of first and second sub magnetic areas, each of the another magnetic area of the first and second side surface alternate with the matrix of first and second sub magnetic areas and the another magnetic areas each have the same polarity, and the plurality of magnetic areas on respective first and second side surfaces have different polarities.

The first side surface may include a first magnetic area and a second magnetic area which are separated from each other, the second side surface may include a fourth magnetic area having the same area as the first magnetic area.

The first side surface may further include a third magnetic area separated from the first magnetic area and the second magnetic area, the second side surface may further include a sixth magnetic area separated from the fourth magnetic area and the fifth magnetic area, and the fifth magnetic area and the sixth magnetic area may have the same area.

The first magnetic area and the sixth magnetic area may have the same area, the third magnetic area and the fourth magnetic area may have the same area and the second magnetic area and the fifth magnetic area may have the same area.

The first magnetic area, the second magnetic area, and the third magnetic area may be sequentially disposed in the row direction.

The fourth magnetic area, the fifth magnetic area and the sixth magnetic area may be disposed in the row direction.

The first frame and the second frame may rotate about a bending axis, and the fifth magnetic area may be positioned closer to the bending axis than the first magnetic area.

Each of the first frame and the second frame may include a thin magnet mounted on at least a portion of positions corresponding to the plurality of magnetic areas.

Each of the first frame and the second frame may include an electromagnet mounted on at least a portion of positions corresponding to the plurality of magnetic areas.

The housing member may further include a first electromagnet mounted on the first frame, and a second electromagnet mounted on the second frame and facing the first electromagnet, and the first electromagnet and the second electromagnet may be controlled to attract or repel the first electromagnet and the second electromagnet.

Two adjacent magnetic areas of the plurality of magnetic areas may be spaced apart by the nonmagnetic area, and the first sub magnetic area and the second sub magnetic area may be positioned in contact with each other in the row direction and the column direction.

A flexible display device may be disposed on the housing member.

A flexible display device according to an embodiment of the disclosure for resolving the above-described problems may include a display panel including a bending portion and non-bending portions provided on both sides of the bending portion, a body portion disposed under the display panel and including a first frame and a second frame opposite to each other, and a connection portion connecting the first frame and the second frame to each other and defining a bending axis. The first frame and the second frame include facing surfaces including a plurality of magnetic areas and a nonmagnetic area, the plurality of magnetic areas are spaced apart from each other by the nonmagnetic area, and two magnetic areas of the plurality of magnetic areas are disposed in the first frame and the second frame, respectively, and face each other, and have opposite polarities.

An attraction may be maintained between the first frame and the second frame.

Two different magnetic areas of the plurality of magnetic areas may be disposed in the first frame and the second frame, respectively, and face each other, and have same polarities that repel the two different magnetic areas.

A distance between the facing surfaces of the first frame and the second frame may be in a range of about 50 µm to about 300 µm.

The first frame and the second frame may have an angle of about 180° to about 183° in a direction in which the display panel is disposed.

Each of the first frame and the second frame may include at least one electromagnet mounted on the plurality of magnetic areas.

The display panel may be in-folded such that a display surface moves to an inside with respect to a bending axis.

When the flexible display device is switched from a bending state to an unbending state, the first frame and the second frame may be automatically aligned.

The connection portion may overlap the bending portion of the display panel, the first frame and the second frame may overlap the non-bending portion of the display panel and rotate about the connection portion, and the first frame and the second frame may be spaced apart from each other in the unbending state of the flexible display device.

The flexible display device may further include a lower structure that performs a light shielding function, a shielding function, and/or a heat dissipation function, and disposed between the display panel and the body portion.

According to embodiments, the separate housing members of the flexible display device may be automatically aligned.

The display panel disposed on the automatically aligned housing members may be improved in the degree of bending deformation.

Effects according to the embodiments are not limited by the contents exemplified above, and other various effects may be appreciated by those of ordinary skill in the art in reference to the specification.

BRIEF DESCRIPTION OF THE DRAWINGS

An additional appreciation according to the embodiments of the invention will become more apparent by describing in detail the embodiments thereof with reference to the accompanying drawings, wherein:

FIG. 5 is an exploded perspective view of a flexible display device according to an embodiment;

FIG. 6 is a side view of an FF1 area of FIG. 5;

FIG. 7 is a side view of an FF2 area of FIG. 5;

DETAILED DESCRIPTION OF THE EMBODIMENTS

Figure 1:
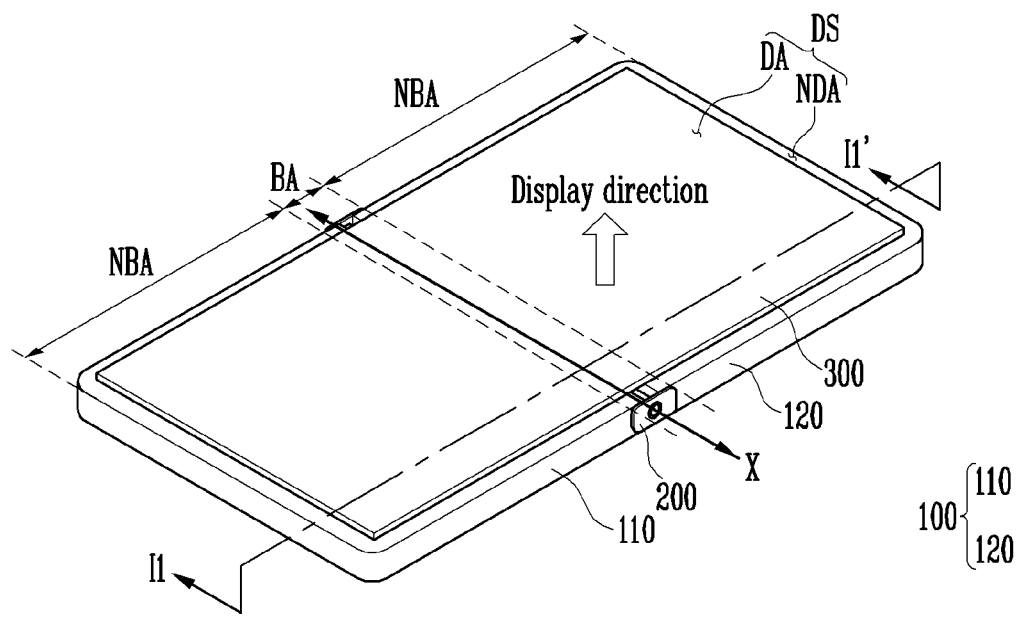
FIG. 1 is a perspective view of a flexible display device according to an embodiment.

Although the invention may be modified in various manners and have additional embodiments, embodiments are illustrated in the accompanying drawings and will be mainly described in the specification. However, the scope of the invention is not limited to the embodiments in the accompanying drawings and the specification and should be construed as including all the changes, equivalents and substitutions included in the spirit and scope of the invention.

When a layer or element is referred to as being "on" another layer or element, it may be directly on the other layer or element, or intervening layers or elements, may be present therebetween. Conversely, when a layer or element, is referred to as being "directly on" another layer or element, intervening layers or elements, may be absent therebetween. Further when a layer or element, is referred to as being "below" another layer or element, it may be directly below the other layer or element, or intervening layers or elements, may be present therebetween. Conversely, when a layer or element, is referred to as being "directly below" another layer or element, intervening layers or elements, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, embodiments will be described in with reference to the accompanying drawings. Like reference numerals refer to like elements throughout the specification.

Figure 2:
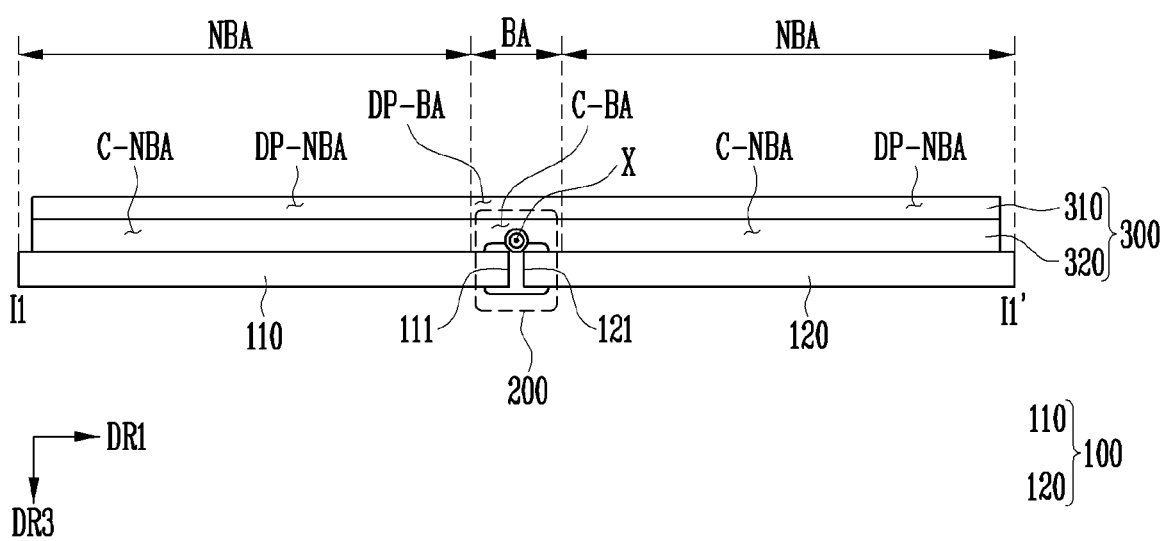
FIG. 2 is a diagram schematically illustrating a cross section of a plane corresponding to a line I1-I1' of FIG. 1.
Figure 3:
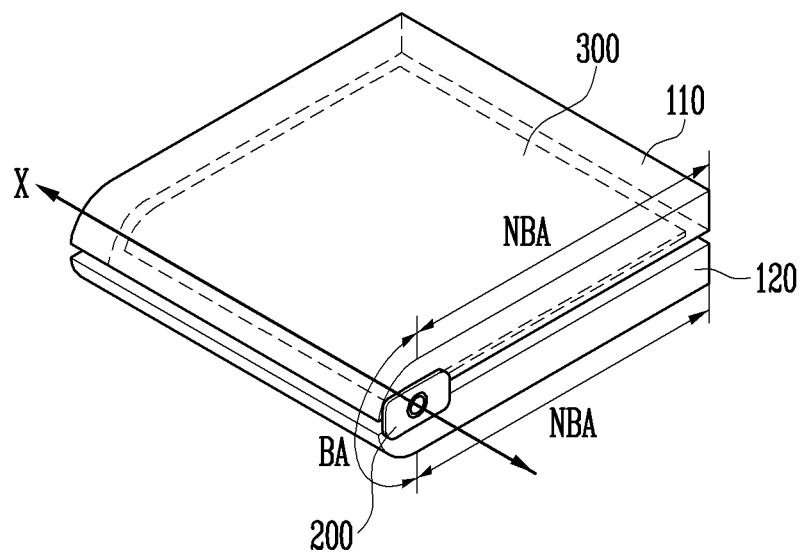
FIGS. 3 and 4 are perspective views of a state in which the flexible display device of the embodiment illustrated in FIG. 1 is in-folded and out-folded, respectively.
Figure 4:
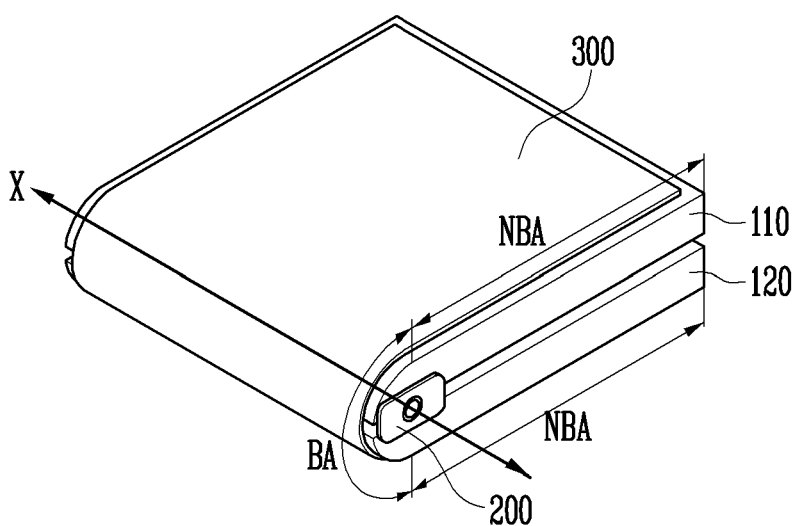

FIG. 1 is a perspective view of a flexible display device according to an embodiment. FIG. 2 is a diagram schematically illustrating a cross section of a plane corresponding to a line I1-I1' of FIG. 1. FIGS. 3 and 4 are perspective views of a state in which the flexible display device of the embodiment illustrated in FIG. 1 is in-folded and out-folded, respectively. FIG. 1 shows a state in which the flexible display device of the embodiment is unfolded. For convenience of description and illustration, a thickness or the like of each component of the flexible display device may be exaggerated.

The flexible display device 1 illustrated in FIGS. 1 to 4 illustrates a foldable display device as an example. However, a shape of the flexible display device 1 is not limited to the illustrated shapes. When a tensile force or a compressive force is applied to the display device 1, generated by bending for example, the shape of the display device may be different from that which is illustrated in the figures.

Referring to FIG. 1, a display surface DS on which an image may be displayed in the flexible display device 1 may be parallel to a surface defined by a first directional axis DR1 and a second directional axis DR2. A normal direction of the display surface DS, that is, a thickness direction of the flexible display device 1 may be indicated by a third directional axis DR3. A front surface (or an upper surface) and a back surface (or a lower surface) of each housing member may be separated by the third directional axis DR3.

In the present specification, the first directional axis DR1, the second directional axis DR2, and the third directional axis DR3 are axes orthogonal to each other and may correspond to an x-axis, a y-axis, and a z-axis, respectively. However, directions indicated by the first to third directional axes DR1, DR2, and DR3 are relative concepts and may be applicable to different directions. Hereinafter, the first to third directions are indicated by the first to third directional axes DR1, DR2, and DR3, and the same reference numerals may refer to the first to third directions as the first to third directional axes DR1, DR2, and DR3, respectively.

As an embodiment, the flexible display device 1 may include areas defined according to a mode or modes of operation. The flexible display device 1 of an embodiment includes a bending area BA that is bent and a non-bending area NBA that is unbent on the basis of a bending axis X (as illustrated for example in FIGS. 2 to 4).

The flexible display device 1 may include at least one bending area BA and at least one non-bending area NBA. Although FIG. 1 illustrates one bending area BA and two non-bending areas NBA, the embodiment is not limited thereto. For example, the flexible display device 1 of an embodiment may include bending areas BA. The flexible display device 1 of an embodiment may include three or more non-bending areas NBA, for example.

In an embodiment, in the flexible display device 1, the bending area BA and the non-bending area NBA may be disposed to be connected to each other. For example, the non-bending areas NBA may be disposed on both sides of the bending area BA.

The display surface DS of the flexible display device 1 may include several areas. The display surface DS of the flexible display device 1 may include a display area DA where an image is displayed and a non-display area NDA adjacent to the display area DA. The non-display area NDA is an area where an image is not displayed. The display area DA may be defined by light emitting elements (not shown), and may include light emitting areas (not shown) that are areas that may emit light of predetermined colors. The display area DA may be a quadrangle shape. The non-display area NDA may be disposed so as to surround the display area DA in plan view. However, the embodiment is not limited thereto, and a shape of the display area DA and a shape of the non-display area NDA may be designed as necessary.

Referring to FIG. 2, the flexible display device 1 includes a module portion 300, a body portion 100 that supports the module portion 300, and a connection portion 200 that connects each of frames 110 and 120 of the body portion 100 to each other. The module portion 300 includes a display panel 310 and a lower structure 320 disposed under the display panel 310.

The display panel 310 may generate an image and provide the generated image to a front surface. The display panel 310 may provide the generated image in a display direction. For example, the display direction may be a normal direction of the display surface DS.

As an embodiment, the display panel 310 may be an organic light emitting display panel. However, the embodiment is not limited thereto, and other types of display panels may be included within the spirit and scope of the invention.

As an embodiment, the display panel 310 may be a flexible display panel. The flexible display panel may include a flexible substrate (not shown) and a flexible window (not shown). In the specification, flexible includes a bendable characteristic, but is not limited to a structure that is bent and completely folded, and may include a structure that is bent at a level of several nanometers (nm). That is, the display panel 310 includes a flexible material.

The display panel 310 may include a display panel bending portion DP-BA corresponding to the bending area BA of the flexible display device 1 and a display panel non-bending portion DP-NBA corresponding to the non-bending area NBA of the flexible display device 1.

The display panel bending portion DP-BA and the display panel non-bending portion DP-NBA may be connected to each other. As an embodiment, the display panel non-bending portion DP-NBA may be plural. For example, the display panel non-bending portion DP-NBA may be connected to one end of the display panel bending portion DP-BA and the other end of the display panel bending portion DP-BA.

The display panel non-bending portion DP-NBA may be disposed on both sides of the display panel bending portion DP-BA with respect to the display panel bending portion DP-BA. The display panel non-bending portion DP-NBA may be disposed to be symmetrical with respect to the display panel bending portion DP-BA. However, the embodiment is not limited thereto, and for example, the display panel non-bending portion DP-NBA may be disposed on one side of the display panel bending portion DP-BA, or, the display panel non-bending portion DP-NBA may be disposed only on one side of the display panel bending portion DP-BA. In an embodiment, the display panel bending portion DP-BA may be disposed between the display panel non-bending portions DP-NBA, and the display panel bending portion DP-BA may be biased to one side of the display panel non-bending portions DP-NBA. In an embodiment, the areas of each display panel non-bending portion DP-NBA may be different from each other.

The lower structure 320 may be positioned between the display panel 310 and the body portion 100. The lower structure 320 may perform a cushion function to relieve impact of the display panel 310. The lower structure 320 may perform a light shielding function, a shielding function, and/or a heat dissipation function.

The lower structure 320 may include several areas. The lower structure 320 may include a bending support portion C-BA corresponding to the bending area BA of the flexible display device 1 and a non-bending support portion C-NBA corresponding to the non-bending area NBA of the flexible display device 1.

As an embodiment, the lower structure 320 may be configured of a soft material disposed over an entire surface. For example, the soft material may include a silicon material. In some embodiments, the lower structure 320 may be configured of a transparent material.

However, a material of the lower structure 320 is not limited thereto and other suitable materials may be used within the spirit and scope of the invention as would be appreciated by those of ordinary skill in the art. In an embodiment, the non-bending support portion C-NBA of the lower structure 320 may be configured of a substantially hard material and the bending support portion C-BA of the lower structure 320 may be configured of a substantially soft material. For example, the hard material may include a stainless steel SUS and/or a plastic material.

The body portion 100 may be a housing member as an embodiment. The body portion 100 serves to support the display panel 310 and the lower structure 320. In some embodiments, the body portion 100 may wrap an outer surface of the display panel 310 at the back of the display surface DS.

As an embodiment, the body portion 100 may be disposed at a position overlapping the bending area BA and the display panel non-bending portion DP-NBA. The body portion 100 may include a material such as silicon, plastic, or meta or any other suitable materials.

As an embodiment, the body portion 100 may include a first frame 110 and a second frame 120. The first frame 110 and the second frame 120 may be disposed to face each other. When the flexible display device 1 is unbent, the first frame 110 and the second frame 120 may include facing surfaces that are adjacent to each other. For example, the first frame 110 may include a first side surface 111 that is adjacent to and facing the second frame 120 and the second frame 120 may include a second side surface 121 that is adjacent to and facing the first frame 110.

Alignment members (for example, magnets or any other material or structure) for normally aligning the first frame 110 and the second frame 120 may be mounted on the first side surface 111 and the second side surface 121, respectively. A detailed description thereof will be described later with reference to FIGS. 5 to 8.

Various parts necessary for the operation of the flexible display device 1 may be positioned in the body portion 100. For example, a PCB (not shown) on which a controller of the flexible display device 1 may be mounted may be positioned in the first frame 110. In the first frame 110, a battery (not shown) may be positioned. A flexible cable (not shown) may be connected between the first frame 110 and the second frame 120.

The first frame 110 and the second frame 120 may be connected to each other so that the first frame 110 and the second frame 120 may rotate with respect to the bending axis X by the connection portion 200.

As an embodiment, the connection portion 200 may be a hinge assembly. The hinge assembly may be disposed at a position overlapping the bending area BA and the display panel bending portion DP-BA.

The hinge assembly may provide the bending axis X to the first frame 110 and the second frame 120. The first frame 110 and the second frame 120 may be rotated with the hinge assembly as the bending axis X. The bending axis X of the flexible display device 1 may be defined by the connection portion 200.

A shape of the connection portion 200 may vary. The shape of the connection portion 200 is not limited to the shapes as illustrated in the figures. For example, the connection portion 200 may be a form of a hinge assembly including at least one joint.

Although not shown, the flexible display device 1 may include a rear surface cover disposed on a lower surface of the body portion 100.

The flexible display device 1 may be bent. In some embodiments, the flexible display device 1 may be in-folded or out-folded.

Referring to FIG. 3, FIG. 3 shows a state in which a flexible display device 1a is in an in-folded state so that the display surface DS moves to an inside. When the flexible display device 1a is in-folded, the bending axis X may be formed on the display surface DS. For example, the hinge assembly may be disposed on upper surfaces of the first frame 110 and the upper surface of the second frame 120.

Referring to FIG. 4, FIG. 4 shows a state in which a flexible display device 1b is in an out-folded state so that the display surface DS moves to an outside. When the flexible display device 1b is out-folded, the bending axis X may be formed under the display surface DS. For example, the hinge assembly may be disposed on lower surfaces of the first frame 110 and the second frame 120. For example, the bending axis X may be formed at a generally upper side position (a position adjacent to upper sides 111a and 121a, refer to FIG. 5) of the first side surface 111 and the second side surface 121.

As an embodiment, the flexible display device 1 may be configured to be in-folded or out-folded in one bending area BA, but is not limited thereto. In the following description, the flexible display device 1 is in-folded in the bending area BA. A state in which the flexible display device is unbent (or unfolded) may be referred to as a first state, and a state in which the flexible display device is bent (or folded) may be referred to as a second state.

As an embodiment, in the second state, a radius of curvature of the bending area BA may be about 5 mm or less. For example, the radius of curvature may indicate a radius of curvature formed by an inner surface of the bending area BA (a lower surface of the display panel) in the second state. For example, the radius of curvature of the flexible display device 1 may be in a range of about 1 mm or more and about 5 mm or less.

The automatic alignment between the first side surface 111 of the first frame 110 and the second side surface 120 of the second frame 120 in a state in which the flexible display device 121 is un-folded will be described in detail with reference to FIGS. 5 to 8.

Figure 8:
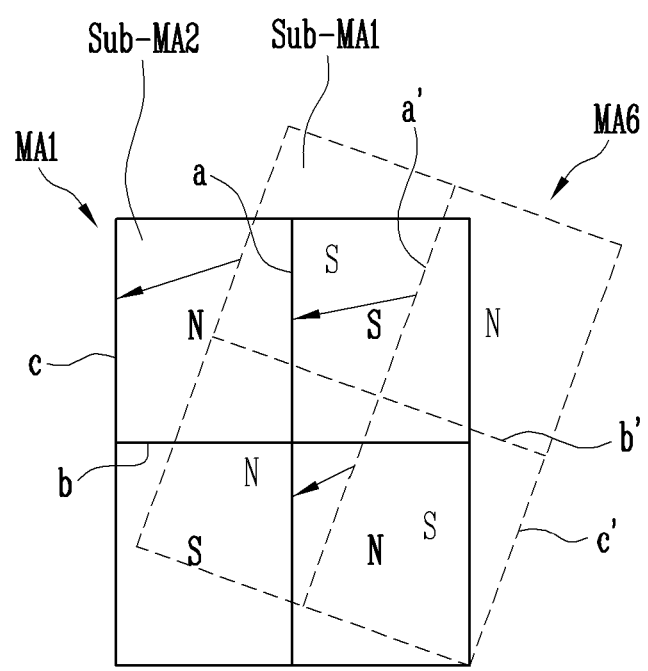
FIG. 8 is a diagram for describing an alignment between facing magnetic areas.

FIG. 5 is an exploded perspective view of a flexible display device according to an embodiment. FIG. 6 is a side view of an FF1 area of FIG. 5. FIG. 7 is a side view of an FF2 area of FIG. 5. FIG. 8 is a diagram for describing an alignment between facing magnetic areas. In FIG. 5, the FF1 area may correspond to the first side surface 111 of the first frame 110 and the FF2 area may correspond to the second side surface 121 of the second frame 120.

Hereinafter, the description corresponds to the description of the first state unless otherwise stated. Referring to FIGS. 5 to 8, in the first state, the first side surface 111 of the first frame 110 and the second side surface 121 of the second frame 120 may face each other.

An upper side 111a of the first frame 110 and an upper side 121a of the second frame 120 may face each other. A lower side 111b of the first frame 110 and a lower side 121b of the second frame 120 may face each other. A left side 111c of the first frame 110 and a right side 121d of the second frame 120 may face each other. A right side 111d of the first frame 110 and a left side 121c of the second frame 120 may face each other. The sides of the first and second frames and their facings with respect to each other may vary aside from what is described and shown in the figures.

It may be understood that the upper sides 111a and 121a, the lower sides 111b and 121b, the left sides 111c and 121c, and the right sides 111d and 121d described above refer to relative positions without being limited by terms.

The first frame 110 and the second frame 120 of the flexible display device 1 may be magnetically attached in the first state. That is, magnetic coupling between the first side surface 111 of the first frame 110 and the second side surface 121 of the second frame 120 may occur.

Each of the first side surface 111 of the first frame 110 and the second side surface 121 of the second frame 120 may include magnetic areas MA1 to MA6 and a nonmagnetic area NMA.

A magnetic area may be defined as an area having magnetism on a surface. One magnetic area may include sub magnetic areas Sub-MA1 and Sub-MA2 having at least one or two polarities.

The sub magnetic areas Sub-MA1 and Sub-MA2 include a first sub magnetic area Sub-MA1 having a first polarity and a second sub magnetic area Sub-MA2 having a second polarity. By way of example, the first polarity and the second polarity correspond to different polarities between which an attractive force acts. For example, the first polarity may be a polarity of an 'S' pole and the second polarity may be a polarity of an 'N' pole. A repulsive force acts between the same polarities.

The one magnetic area (for example, MA1) may have a matrix form in which the first sub magnetic area Sub-MA1 and the second sub magnetic area Sub-MA2 are alternately arranged at least once in a row direction and the first sub magnetic area Sub-MA1 and the second sub magnetic area Sub-MA2 are alternately arranged at least once in a column direction. As an embodiment, the first sub magnetic area Sub-MA1 and the second sub magnetic area Sub-MA2 adjacent to each other in the one magnetic area may be disposed to be in contact with each other.

In the specification, it may be understood that the row direction and the column direction are relative directions which mean that the row direction corresponds to a left and right direction in the drawing and the column direction corresponds to an up and down direction in the drawing. For example, the row direction may correspond to the second directional axis DR2, and the column direction may correspond to the third directional axis DR3.

As an embodiment, the first sub magnetic sub area Sub-MA1 and the second sub magnetic area Sub-MA2 adjacent to each other in the one magnetic area (for example, MA1) may be positioned to be in contact with each other.

In the embodiment, an example in which the one magnetic area includes sub magnetic areas disposed in a 2×2 matrix form will be described. For example, the one magnetic area may be a matrix form in which the first sub magnetic area Sub-MA1 is positioned in a first row and first column, the second sub magnetic area Sub-MA2 is positioned in a first row and second column, the second sub magnetic area Sub-MA2 is positioned in a second row and first column, and the first sub magnetic area Sub-MA1 is positioned in a second row and second column. By way of example, each of the first side surface 111 and the second side surface 121 may include three magnetic areas MA1 to MA3 and MA4 to MA6.

Each sub magnetic area may be an area defined by a magnetic substance having one polarity or an area magnetized to have one polarity.

As an embodiment, a thin magnet having a surface polarity of the 'S' pole may be mounted on the first sub magnetic area Sub-MA1 in each of the frames 110 and 120. A thin magnet having a surface polarity of the 'N' pole may be mounted on the second sub magnetic area Sub-MA2 in each of the frames 110 and 120.

The nonmagnetic area NMA may be defined as an area that does not have magnetism on the surface. The nonmagnetic area NMA may distinguish the adjacent magnetic areas MA1 to MA6. For example, the nonmagnetic area NMA may surround a border of the one magnetic area (for example, MA1).

As an embodiment, the first side surface 111 of the first frame 110 may include the first magnetic area MA1, the second magnetic area MA2, and the third magnetic area MA3 spaced apart by the nonmagnetic area NMA. The second side surface 121 of the second frame 120 may include the fourth magnetic area MA4, the fifth magnetic area MA5, and the sixth magnetic area MA6 spaced apart by the nonmagnetic area NMA.

The first magnetic area MA1 and the sixth magnetic area MA6 may be positioned on the respective side surfaces 111 and 112 to face each other. The second magnetic area MA2 and the fifth magnetic area MA5 may be positioned on the respective side surfaces 111 and 112 to face each other. The third magnetic area MA3 and the fourth magnetic area MA4 may be positioned on the respective side surfaces 111 and 112 to face each other. The term "face each other" may include directly facing or indirectly facing. Facing may also be defined by the folding or bending of the display.

As an embodiment, referring to FIG. 6, the first magnetic area MA1, the second magnetic area MA2, and the third magnetic area MA3 in the first side surface 111 may be sequentially spaced apart in the row direction. Similarly, referring to FIG. 7, the fourth magnetic area MA4, the fifth magnetic area MA5, and the sixth magnetic area MA6 in the second side surface 121 may be sequentially spaced apart in the row direction. However, a disposition form and the number of the magnetic areas MA1 to MA6 in each of the side surfaces 111 and 112 are not limited to those shown in the figures. In an embodiment, the magnetic areas MA1 to MA6 may be disposed in the row direction and the column direction.

As an embodiment, the first sub magnetic area Sub-MA1 (for example, the "S" pole) positioned in the first row and first column of the first magnetic area MA1 and the second sub magnetic area Sub-MA2 (for example, the "N" pole) positioned in the first row and second column of the sixth magnetic area MA6 may have the same area and may face each other. The second sub magnetic area Sub-MA2 (for example, the "N" pole) positioned in the first row and second column of the first magnetic area MA1 and the first sub magnetic area Sub-MA1 (for example, the "S" pole) positioned in the first row and first column of the sixth magnetic area MA6 may have the same area and may face each other. The second sub magnetic area Sub-MA2 (for example, the "N" pole) positioned in the second row and first column of the first magnetic area MA1 and the first sub magnetic area Sub-MA1 (for example, the "S" pole) positioned in the second row and second column of the sixth magnetic area MA6 may have the same area and may face each other. The first sub magnetic area Sub-MA1 (for example, the "S" pole) positioned in the second row and second column of the first magnetic area MA1 and the second sub magnetic area Sub-MA2 (for example, the "N" pole) positioned in the second row and first column of the sixth magnetic area MA6 may have the same area and may face each other. Therefore, an attractive force may act between the first magnetic area MA1 of the first side surface 111 and the sixth magnetic area MA6 of the second side surface 121.

For example, since each sub magnetic area of the first magnetic area MA1 and each sub magnetic area of the sixth magnetic area MA6 are disposed in a matrix form to have substantially the same area, the first magnetic area MA1 and the sixth magnetic area MA6 may be aligned. An attractive force acts between the first sub magnetic areas Sub-MA1 disposed in the first magnetic area MA1 and the second sub magnetic areas Sub-MA2 disposed in the sixth magnetic area MA6, which face the first sub magnetic areas Sub-MA1, and a repulsive force acts between the first sub magnetic areas Sub-MA1 disposed in the first magnetic area MA1 and the first sub magnetic areas Sub-MA1 adjacent to the second sub magnetic areas Sub-MA2 disposed in the sixth magnetic area MA6. Therefore, the first magnetic area MA1 and the sixth magnetic area MA6 may be substantially aligned. It should be understood that the assignment of poles as "S" or "N" with respect to the sub-magnetic areas is not limited to that which is shown in the figures. Other configurations may also be possible within the spirit and scope of the invention as would be understood by those of ordinary skill in the art.

For example, referring to FIG. 8, a horizontal line b and a vertical line a which divide each of the sub magnetic areas Sub-MA1 and Sub-MA2 of the first magnetic area MA1, and a border line c defining the first magnetic area MA1 may be aligned with a horizontal line b' and a vertical line a' which divide each of the sub magnetic areas Sub-MA1 and Sub-MA2 of the sixth magnetic area MA6, and a border line c' defining the sixth magnetic area MA6.

A relationship between the first magnetic area MA1 and the sixth magnetic area MA6 may be equally applied to a relationship between the second magnetic area MA2 and the fifth magnetic area MA5, a relationship between the third magnetic area MA3 and the fourth magnetic area MA4.

Therefore, an attractive force due to a magnetic force of attraction may be generated between the first side surface 111 of the first frame 110 and the second side surface 121 of the second frame 120, which faces the first side surface 110, by each of the magnetic areas MA1 to MA6 positioned on the first side surface 111 and the second side surface 121. When the flexible display device 1 is in the first state, an attractive force may be generated between the first frame 110 and the second frame 120. The first frame 110 and the second frame 120 may be automatically aligned and seated at a designated position.

When the first frame 110 and the second frame 120 are automatically aligned at the designated position, the degree of bending deformation that may occur in the lower structure 320 and the display panel 310 (by way of example, in the display panel bending portion DP-BA) disposed on the first frame 110 and the second frame 120 may be improved.

The flexible display device 1 according to an embodiment will be described. Hereinafter, the description of the same components as those of FIGS. 1 to 8 will be omitted, and the same or similar reference numerals are used for the same components as those of FIGS. 1 to 8.

Figure 9:
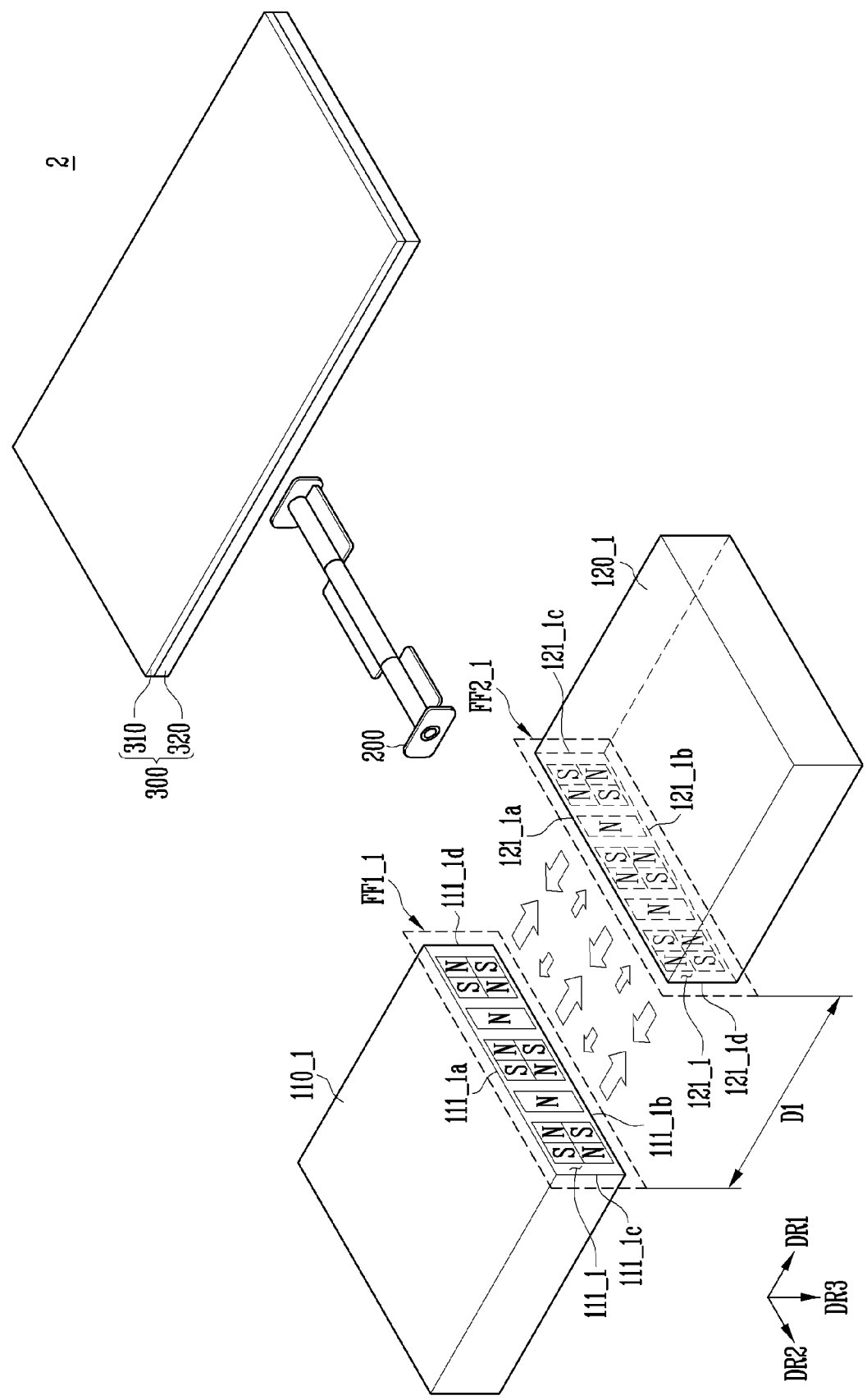
FIG. 9 is an exploded perspective view of a flexible display device according to an embodiment.
Figure 10:
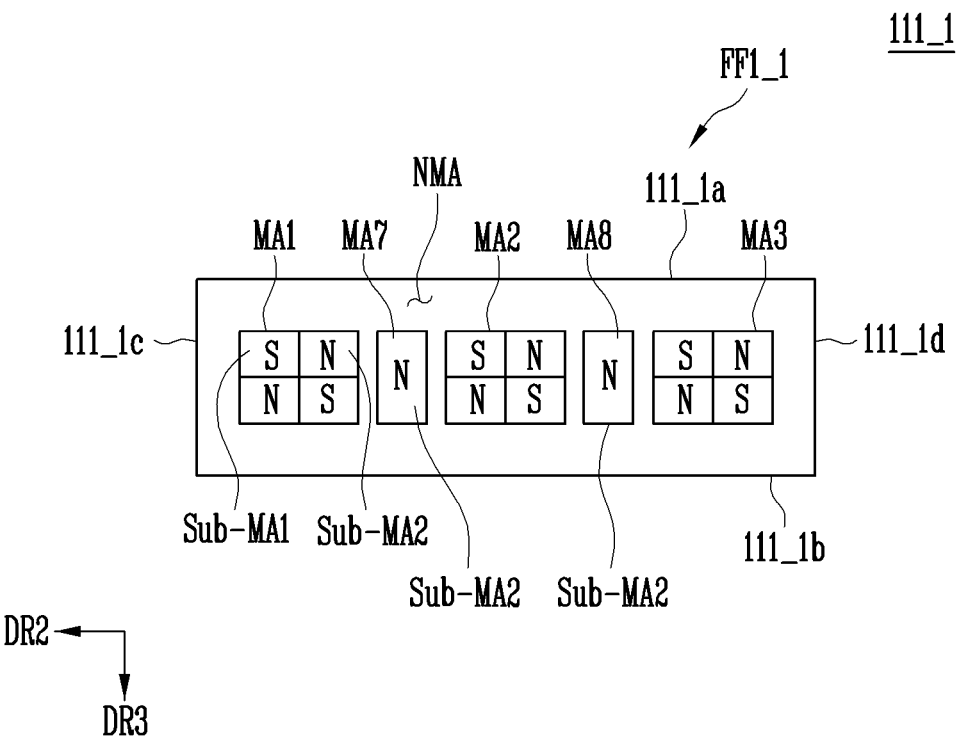
FIG. 10 is a side view of an FF1_1 area of FIG. 9.
Figure 11:
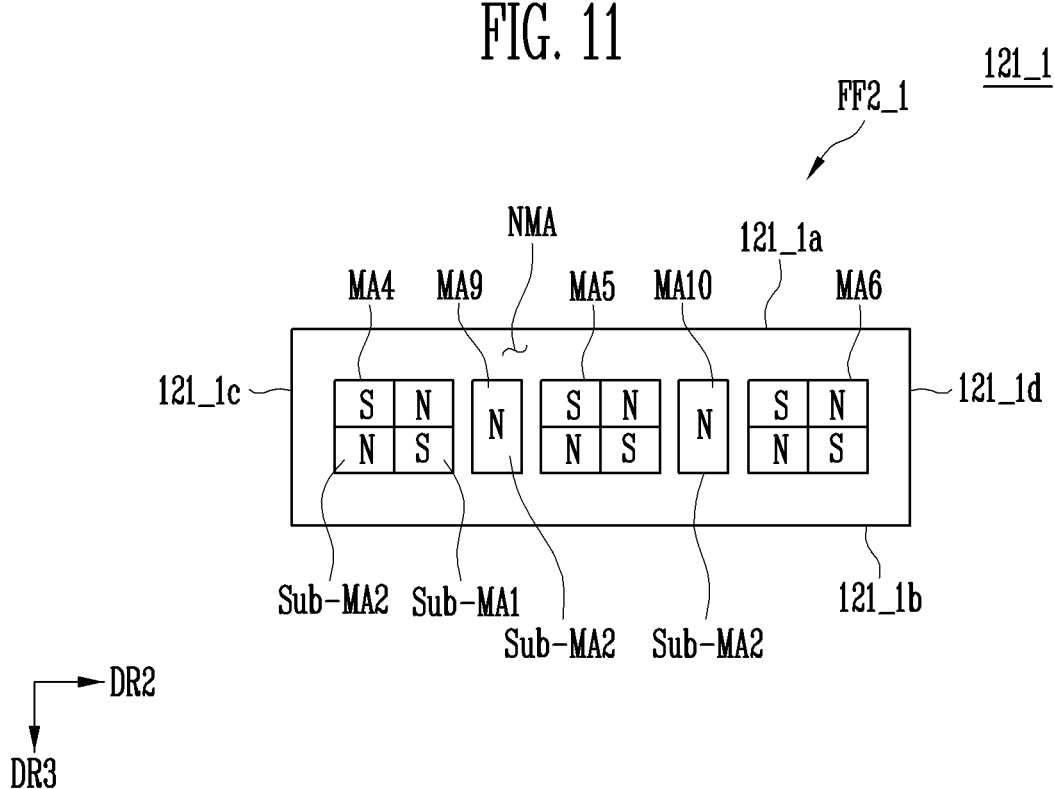
FIG. 11 is a side view of an FF2_1 area of FIG. 9.

FIG. 9 is an exploded perspective view of a flexible display device according to an embodiment. FIG. 10 is a side view of an FF1_1 area of FIG. 9. FIG. 11 is a side view of an FF2_1 area of FIG. 9.

Referring to FIGS. 9 to 11, the flexible display device 2 according to the embodiment is different from the flexible display device 1 according to the embodiment of FIGS. 5 to 7 in that the flexible display device 2 includes one magnetic area positioned on a first side surface 111_1 and another magnetic area (for example, MA10), which faces the one magnetic area (for example, MA7) and have the same polarity as the one magnetic area, on a second side surface 121_1.

As an embodiment, the first side surface 111_1 of a first frame 110_1 and the second side surface 121_1 of a second frame 120_1 may include not only an area where an attractive force acts but also an area where a repulsive force acts.

As an embodiment, the first frame 110_1 may include a seventh magnetic area MA7 disposed between the first magnetic area MA1 and the second magnetic area MA2, and an eighth magnetic area MA8 disposed between the second magnetic area MA2 and the third magnetic area MA3, on the first side surface 111_1. That is, the first magnetic area MA1, the seventh magnetic area MA7, the second magnetic area MA2, the eighth magnetic area MA8, and the third magnetic area MA3 may be sequentially spaced apart in the row direction.

Correspondingly, the second frame 120_1 may include a ninth magnetic area MA9 disposed between the fourth magnetic area MA4 and the fifth magnetic area MA5 and a tenth magnetic area MA10 disposed between the fifth magnetic area MA5 and the sixth magnetic area MA6, on the second side surface 121_1. The fourth magnetic area MA4, the ninth magnetic area MA9, the fifth magnetic area MA5, the tenth magnetic area MA10, and the sixth magnetic area MA6 may be sequentially spaced apart in the row direction.

The seventh magnetic area MA7 of the first side surface 111_1 and the tenth magnetic area MA10 of the second side surface 121_1 may be disposed to face each other and the eighth magnetic area MA8 of the first side surface 111_1 and the ninth magnetic area MA9 of the second side surface 121_1 may be disposed to face each other.

Each of the seventh magnetic area MA7 and the tenth magnetic area MA10 may include at least one sub magnetic area (for example, Sub-MA2). The respective sub magnetic areas (for example, Sub-MA2) facing each other in the seventh magnetic area MA7 and the tenth magnetic area MA10 may have the same area. For example, the seventh magnetic area MA7 may include one second sub magnetic area Sub-MA2, and the tenth magnetic area MA10 facing the seventh magnetic area MA7 may include one second sub magnetic area Sub-MA2 having the same area as the second sub magnetic area Sub-MA2 of the seventh magnetic area MA7.

As an embodiment, a repulsive force may act between the seventh magnetic area MA7 of the first side surface 111_1 and the tenth magnetic area MA10 of the second side surface 121_1. That is, the second sub magnetic area Sub-MA2 included in the seventh magnetic area MA7 and the second sub magnetic area Sub-MA2 included in the tenth magnetic area MA10 may have the same polarity.

As an embodiment, each of the first frame 110_1 and the second frame 120_1 may have a thin magnet having a surface polarity of an 'N' pole, which is mounted on the one second sub magnet area Sub-MA2 in the seventh magnet area MA7 and the one second sub magnet area Sub-MA2 in the tenth magnet area MA10.

The descriptions of the seventh magnetic area MA7 of the first side surface 111_1 and the tenth magnetic area MA10 of the second side surface 121_1 may be equally applied to the eighth magnetic area MA8 of the first side surface 111_1 and the ninth magnetic area MA9 of the second side surface 121_1.

The first frame 110_1 and the second frame 120_1 may be easily aligned by the first to sixth magnetic areas MA1 to MA6 where the attractive force acts, and a distance between the frames 110_1 and 120_1 may be maintained by the seventh to tenth magnetic areas MA7 to MA10 where the repulsive force acts. As an embodiment, the distance may be in a range of about 50 μm to about 300 μm.

For example, in the first state, the side surfaces facing each other between the first frame 110_1 and the second frame 120_1 may be spaced apart from each other by an appropriate distance, and thus the degree of bending deformation that may occur in the lower structure 320 and the display panel 310 disposed on the first frame 110_1 and the second frame 120_1 may be improved.

The embodiment is not limited to the number of the magnetic areas MA1 to MA10, the number of sub magnetic areas Sub-MA1 and Sub-MA2, and the disposition thereof shown in the drawings. The embodiment may be applied to, for example, both of the area where the attractive force acts and the area where the repulsive force acts are included between the facing side surfaces of the first frame 110_1 and the second frame 120_1.

Figure 12:
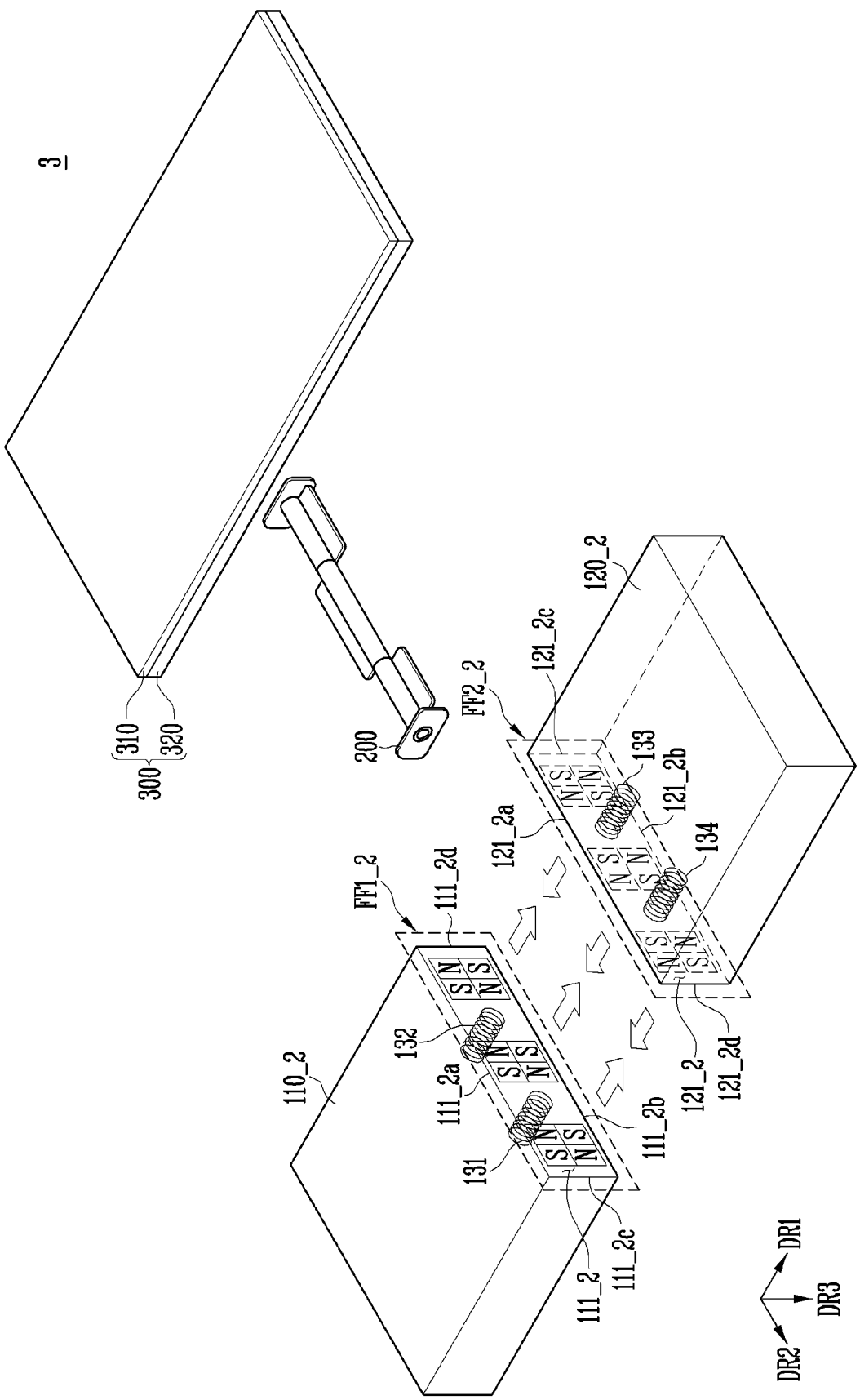
FIG. 12 is an exploded perspective view of a flexible display device according to an embodiment.
Figure 13:
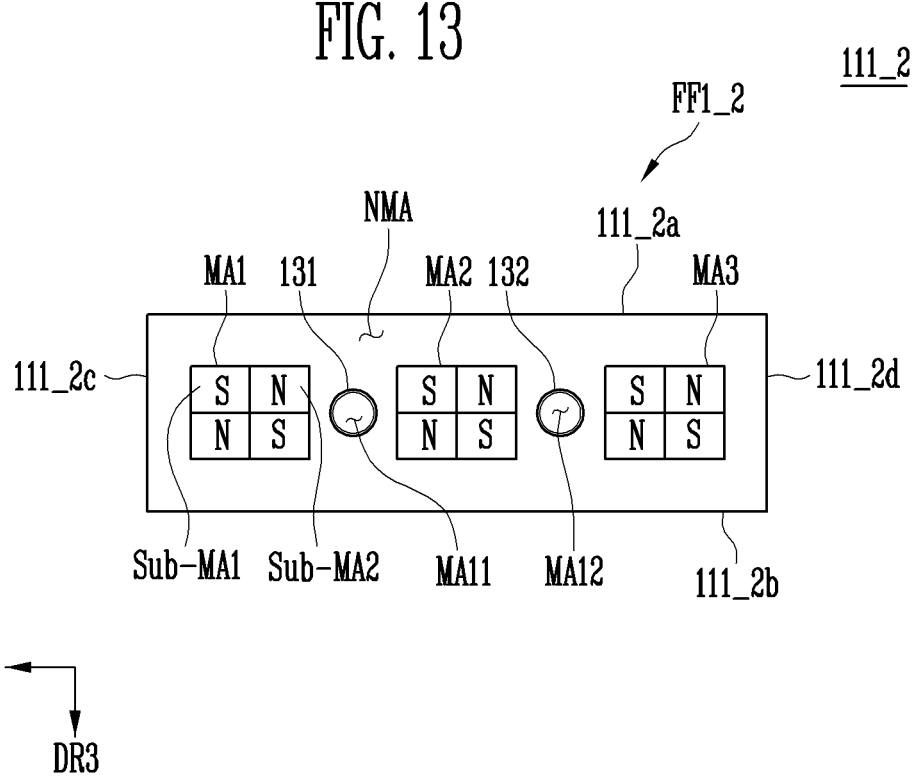
FIG. 13 is a side view of an FF1_2 area of FIG. 12.
Figure 14:
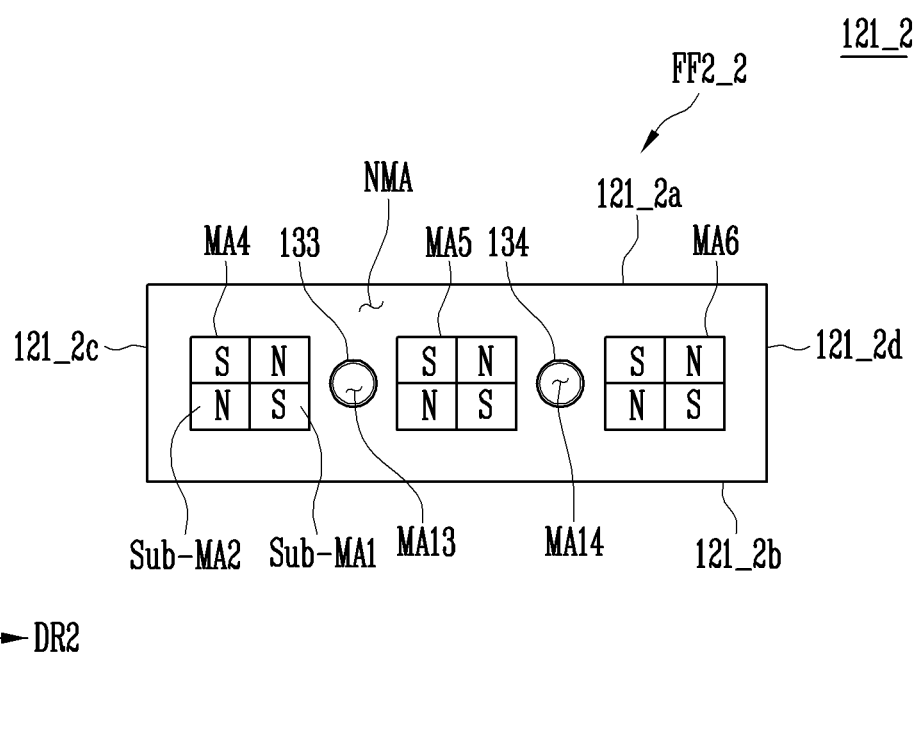
FIG. 14 is a side view of an FF2_2 area of FIG. 12.

FIG. 12 is an exploded perspective view of a flexible display device according to an embodiment. FIG. 13 is a side view of an FF1_2 area of FIG. 12. FIG. 14 is a side view of an FF2_2 area of FIG. 12.

Referring to FIGS. 12 to 14, the flexible display device 3 according to the embodiment is different from the flexible display device 1 according to the embodiment of FIGS. 5 to 7 in that each of frames 110_2 and 120_2 includes electromagnets 131 to 134.

As an embodiment, the first frame 110_2 may include an eleventh magnetic area MA11 disposed between the first magnetic area MA1 and the second magnetic area MA2 and a twelfth magnetic area MA12 disposed between the second magnetic area MA2 and the third magnetic area MA3, on a first side surface 111_2. That is, the first magnetic area MA1, the eleventh magnetic area MA11, the second magnetic area MA2, the twelfth magnetic area MA12, and the third magnetic area MA3 may be sequentially spaced apart in the row direction.

Correspondingly, the second frame 120_2 may include a thirteenth magnetic area MA13 disposed between the fourth magnetic area MA4 and the fifth magnetic area MA5 and a fourteenth magnetic area MA14 disposed between the fifth magnetic area MA5 and the sixth magnetic area MA6, on a second side surface 121_2. That is, the fourth magnetic area MA4, the thirteenth magnetic area MA13, the fifth magnetic area MA5, the fourteenth magnetic area MA14, and the sixth magnetic area MA6 may be sequentially spaced apart in the row direction.

The eleventh magnetic area MA11 of the first side surface 111_2 and the fourteenth magnetic area MA14 of the second side surface 121_2 may be disposed to face each other and the twelfth magnetic area MA12 of the first side surface 111_2 and the thirteenth magnetic area MA13 of the second side surface 121_2 may be disposed to face each other.

The first frame 110_2 may include the eleventh magnetic area MA11, a first electromagnet 131 that is mounted on the eleventh magnetic area MA11, the twelfth magnetic area MA12, and a second electromagnet 132 mounted on the twelfth magnetic area MA12. The second frame 120_2 may include the thirteenth magnetic area MA13, a third electromagnet 133 mounted on the thirteenth magnetic area MA13, the fourteenth magnetic area MA14, and a fourth electromagnet 134 mounted on the fourteenth magnetic area MA14.

As an embodiment, each of the electromagnets 131 to 134 may be implemented in a form of a coil through which a current flows. However, the implementation form of the electromagnets 131 to 134 are not limited to those shown in the drawings, but may be implemented in various forms within the spirit and scope of the invention.

Polarities of the magnetic areas MA11 to MA14 of the respective side surfaces 111_2 and 121_2 corresponding to the electromagnets 131 to 134 may be freely selected to meet design needs as would be appreciated by those of ordinary skill in the art. When the electromagnets 131 to 134 are mounted on each of the frames 110_2 and 120_2, the flexible display device 3 may be freely controlled so that an attractive force acts, a repulsive force acts, or a force does not act between the facing electromagnets. The flexible display device 3 may freely control the magnitude of the attractive force or the repulsive force between the facing electromagnets 131 to 134.

When the attractive force acts between the facing electromagnets 131 to 134 in the first frame 110_2 and the second frame 120_2, the first frame 110_2 and the second frame 120_2 may be automatically aligned and seated. When the repulsive force acts between the facing electromagnets 131 to 134 in the first frame 110_2 and the second frame 120_2, the side surfaces facing each other between the first frame 110_2 and the second frame 120_2 may be spaced apart from each other by an appropriate distance in the first state.

The present embodiment is not limited to the number of magnets (not shown), the number of electromagnets 131 to 134, the number of magnetic areas MA1 to MA6 and MA11 to MA14, the number of sub magnetic areas Sub-MA1 and Sub-MA2, and the disposition thereof. Additionally, the shapes and materials of the magnets and electromagnets is not limited, and any suitable magnet, electromagnet, or other attractive material may be used as would be appreciated by those of ordinary skill in the art within the spirit and scope of the invention. The embodiment may be applicable to electromagnets 131 to 134 mounted between the facing side surfaces of the first frame 110_2 and the second frame 120_2. For example, the embodiment may be applicable to magnetic areas MA1 to MA6 and MA11 to MA14 that perform the functions described above using the electromagnets 131 to 134.

Figure 15:
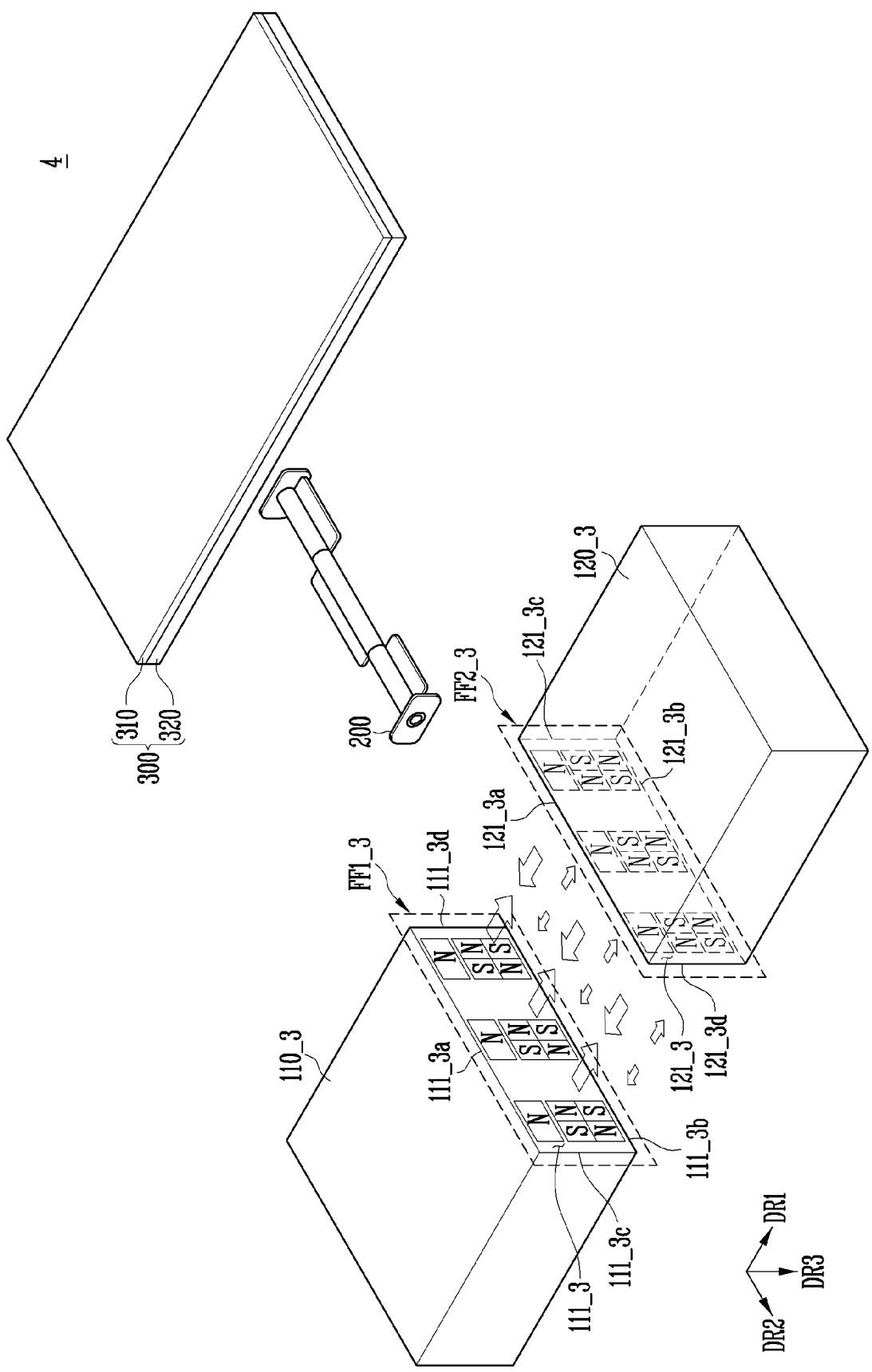
FIG. 15 is an exploded perspective view of a flexible display device according to an embodiment.
Figure 16:
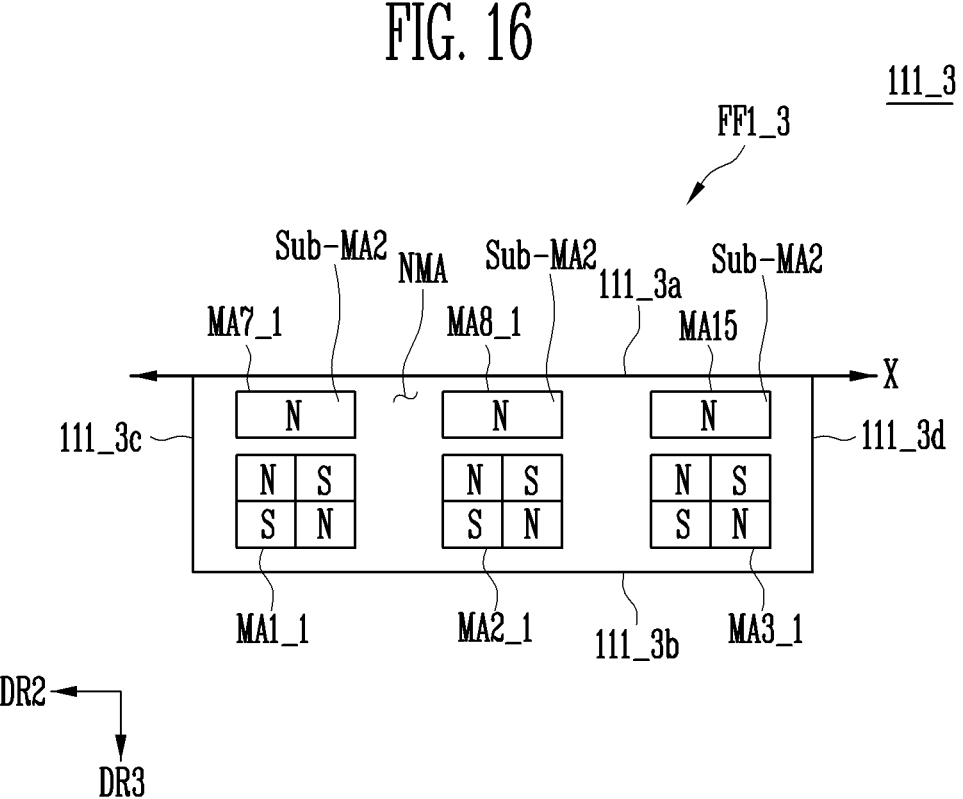
FIG. 16 is a side view of an FF1_3 area of FIG. 15.
Figure 17:
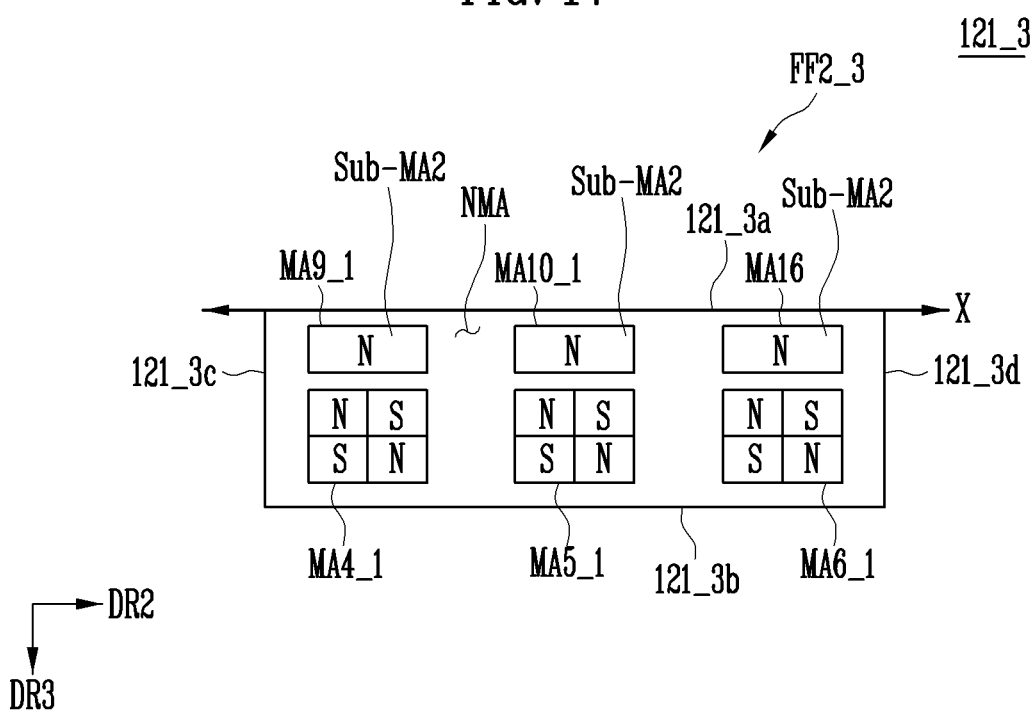
FIG. 17 is a side view of an FF2_3 area of FIG. 15.
Figure 18:
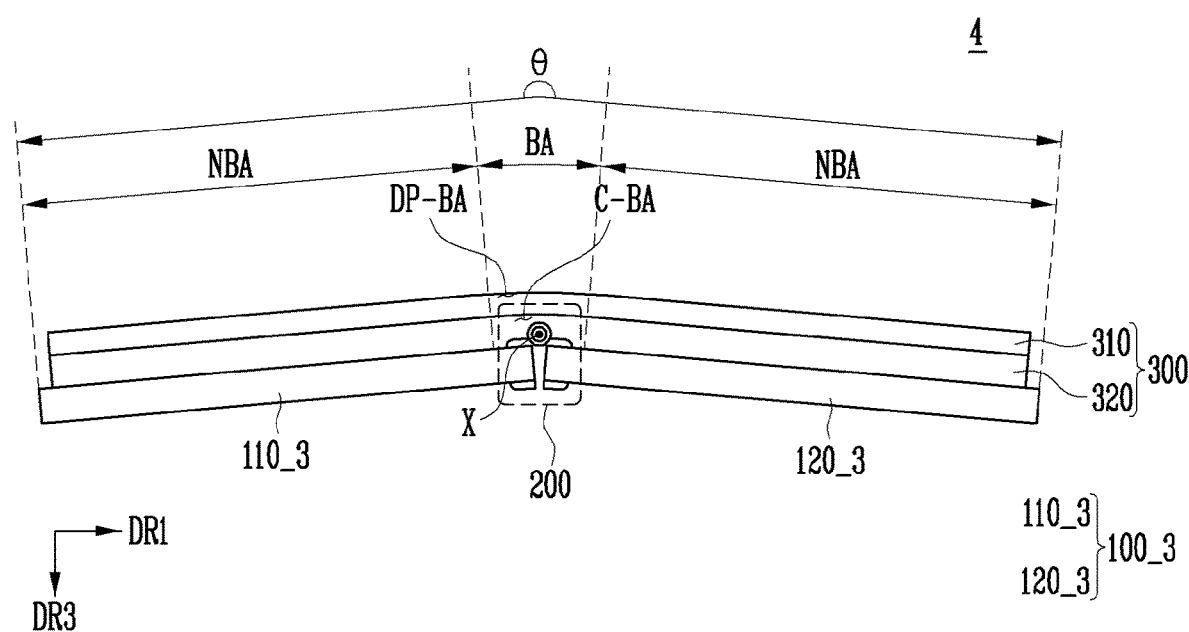
FIG. 18 is a schematic cross-sectional view of the flexible display device of FIG. 15.

FIG. 15 is an exploded perspective view of a flexible display device according to an embodiment. FIG. 16 is a side view of an FF1_3 area of FIG. 15. FIG. 17 is a side view of an FF2_3 area of FIG. 15. FIG. 18 is a schematic cross-sectional view of the flexible display device of FIG. 15.

Referring to FIGS. 15 to 18, the flexible display device 4 according to the embodiment is different from the flexible display device 1 according to the embodiment of FIGS. 2 and 5 to 7 in that the flexible display device 4 may include one magnetic area (for example, MA7_1, MA8_1, or MA15) positioned on a first side surface 111_3 and another magnetic area (MA9_1, MA10_1, or MA16), which faces and has the same polarity as the one magnetic area (for example, MA7_1, MA8_1, or MA15), on a second side surface 121_3. The flexible display device 4 according to the embodiment is different from the flexible display device 2 according to the embodiment of FIGS. 8 to 10 in that the disposition or arrangements of the magnetic areas MA1_1 to MA10_1, MA15, and MA16 are different from each other.

As an embodiment, a first frame 110_3 may include a seventh magnetic area MA7_1 spaced apart from a first magnetic area MA1_1 in the column direction, an eighth magnetic area MA8_1 spaced apart from a second magnetic area MA2_1 in the column direction, and a fifteenth magnetic area MA15 spaced apart from a third magnetic area MA3_1 in the column direction, on the first side surface 111_3. For example, the first magnetic area MA1_1, the second magnetic area MA2_1, and the third magnetic area MA3_1 may be spaced apart from the seventh magnetic area MA7_1, the eighth magnetic area MA8_1, and the fifteenth magnetic area MA15 in the third direction DR3.

The second frame 120_3 may include a ninth magnetic area MA9_1 spaced apart from a fourth magnetic area MA4_1 in the column direction, a tenth magnetic area MA10_1 spaced apart from a fifth magnetic area MA5_1 in the column direction, and a sixteenth magnetic area MA16 spaced apart from a sixth magnetic area MA6_1 in the column direction, on the second side surface 121_3.

As an embodiment, the seventh magnetic area MA7_1 of the first side surface 111_3 may face the sixteenth magnetic area MA16 of the second side surface 121_3. The seventh magnetic area MA7_1 and the sixteenth magnetic area MA16 may have the same polarity and the same area.

A relationship between the eighth magnetic area MA8_1 of the first side surface 111_3 and the tenth magnetic area MA10_1 of the second side surface 121_3 may be equally applied to a relationship between the seventh magnetic area MA7_1 and the sixteenth magnetic area MA16. Similarly, a relationship between the fifteenth magnetic area MA15 of the first side surface 111_3 and the ninth magnetic area MA9_1 of the second side surface 121_3 may be equally applied to a relationship between the seventh magnetic area MA7_1 and the sixteenth magnetic area MA16.

As an embodiment, the seventh magnetic area MA7_1, the eighth magnetic area MA8_1, and the fifteenth magnetic area MA15 of the first side surface 111_3, between which a repulsive force acts with the facing magnetic areas (for example, MA9_1, MA10_1, and MA16) may be positioned at a position relatively closer to the bending axis X (a position closer than the display panel 310 when the flexible display panel is in-folded) than the first magnetic area MA1_1, the second magnetic area MA2_1, and the third magnetic area MA3_1 between which an attractive force acts with the facing magnetic areas (for example, MA4_1, MA5_1, and MA6_1). As in the first side surface 111_3 of the first frame 110_1, the second frame 120_3 may have a disposition relationship corresponding to the first side surface 111_3 also on the second side surface 121_3.

In contrast to an example in which the first frame 110_3 and the second frame 120_3 maintain an angle of about 180° in the first state of an embodiment, the flexible display device 4 of the embodiment may maintain an angle of 180° or more in the first state. As an embodiment, in the first state, the first frame 110_3 and the second frame 120_3 may maintain an angle of about 180° to about 183° in a direction in which the display panel 310 may be disposed.

When the first frame 110_3 and the second frame 120_3 maintain an angle of about 180° or more, the degree of bending deformation that may occur in the lower structure 320 and the display panel 310 disposed on the first frame 110_3 and the second frame 120_3 may be improved.

Although the disclosure has been described with reference to the accompanying drawings, it will be understood and appreciated by those skilled in the art that the embodiments may be implemented in other forms without departing from the spirit and scope of the invention. Accordingly, it should be understood that the embodiments described above are illustrative and not restrictive.

What is claimed is:
1. A housing member comprising:
a first frame having a first side surface; and
a second frame having a second side surface disposed to face the first side surface of the first frame,
wherein each of the first side surface and the second side surface includes a plurality of magnetic areas and a nonmagnetic area that separates the magnetic areas,
at least one magnetic area of the plurality of magnetic areas includes a first sub magnetic area having a first polarity and a second sub magnetic area having a second polarity different from the first polarity, the first sub magnetic area and the second sub magnetic area are in the form of a matrix and alternately disposed in a row direction and a column direction crossing the row direction, and
each of the first side surface and the second side surface includes another magnetic area between the matrix of first and second sub magnetic areas, each of the another magnetic area of the first and second side surface alternate with the matrix of first and second sub magnetic areas and the another magnetic areas each have the same polarity, and the plurality of magnetic areas on respective first and second side surface have different polarities.

2. The housing member according to claim 1, wherein the first side surface includes a first magnetic area and a second magnetic area which are separated from each other,
the second side surface includes a fourth magnetic area having the same area as the first magnetic area.

3. The housing member according to claim 2, wherein the first side surface further includes a third magnetic area separated from the first magnetic area and the second magnetic area,
the second side surface further includes a sixth magnetic area separated from the fourth magnetic area and the fifth magnetic area, and
the fifth magnetic area and the sixth magnetic area have the same area.

4. The housing member of claim 3, wherein the first magnetic area and the sixth magnetic area have the same area, the third magnetic area and the fourth magnetic area have the same area and the second magnetic area and the fifth magnetic area have the same area.

5. The housing member according to claim 3, wherein the first magnetic area, the second magnetic area, and the third magnetic area are sequentially disposed in the row direction.

6. The housing member according to claim 3, wherein the fourth magnetic area, the fifth magnetic area and the sixth magnetic area are disposed in the row direction.

7. The housing member according to claim 6, wherein the first frame and the second frame rotate about a bending axis, and
the fifth magnetic area is positioned closer to the bending axis than the first magnetic area.

8. The housing member according to claim 1, wherein each of the first frame and the second frame includes a thin magnet mounted on at least a portion of positions corresponding to the plurality of magnetic areas.

9. The housing member according to claim 1, wherein each of the first frame and the second frame includes an electromagnet mounted on at least a portion of positions corresponding to the plurality of magnetic areas.

10. The housing member according to claim 9, further comprising:
a first electromagnet mounted on the first frame; and
a second electromagnet mounted on the second frame and facing the first electromagnet,
wherein the first electromagnet and the second electromagnet are controlled to attract or repel the first electromagnet and the second electromagnet.

11. The housing member according to claim 1, wherein two adjacent magnetic areas of the plurality of magnetic areas are spaced apart by the nonmagnetic area, and the first sub magnetic area and the second sub magnetic area are positioned in contact with each other in the row direction and the column direction.

12. The housing member of claim 1, further comprising a flexible display device disposed on the housing member.

13. A flexible display device comprising:
a display panel including a bending portion and non-bending portions provided on both sides of the bending portion;
a body portion disposed under the display panel and including a first frame and a second frame opposite to each other; and
a connection portion connecting the first frame and the second frame to each other and defining a bending axis,
wherein the first frame and the second frame include facing surfaces including a plurality of magnetic areas and a nonmagnetic area,
the plurality of magnetic areas are spaced apart from each other by the nonmagnetic area,
at least one magnetic area of the plurality of magnetic areas includes a first sub magnetic area having a first polarity and a second sub magnetic area having a second polarity different from the first polarity, the first sub magnetic area and the second sub magnetic area are in the form of a matrix and alternately disposed in a row direction and a column direction crossing the row direction, and
each of the first side surface and the second side surface includes another magnetic area between the matrix of first and second sub magnetic areas, each of the another magnetic area of the first and second side surface alternate with the matrix of first and second sub magnetic areas and the another magnetic areas each have the same polarity, and the plurality of magnetic areas on respective first and second side surface have opposite polarities that attract.

14. The flexible display device according to claim 13, wherein an attraction is maintained between the first frame and the second frame.

15. The flexible display device according to claim 13, wherein a distance between the facing surfaces of the first frame and the second frame is in a range of about 50 pm to about 300 pm.

16. The flexible display device according to claim 13, wherein the first frame and the second frame have an angle of about 180° to about 183° in a direction in which the display panel is disposed.

17. The flexible display device according to claim 13, wherein each of the first frame and the second frame includes at least one electromagnet mounted on the plurality of magnetic areas.

18. The flexible display device according to claim 13, wherein the display panel is in-folded such that a display surface moves to an inside with respect to a bending axis.

19. The flexible display device according to claim 13, wherein, when the flexible display device is switched from a bending state to an unbending state, the first frame and the second frame are automatically aligned.

20. The flexible display device according to claim 19, wherein the connection portion overlaps the bending portion of the display panel,
the first frame and the second frame overlap the non-bending portion of the display panel, and rotate about the connection portion, and
the first frame and the second frame are spaced apart from each other in the unbending state of the flexible display device.

21. The flexible display device according to claim 13, further comprising:
a lower structure that performs a light shielding function, a shielding function, and a heat dissipation function, and disposed between the display panel and the body portion.

22. The flexible display device according to claim 13, further comprising:
a lower structure that performs a light shielding function, a shielding function, or a heat dissipation function, and disposed between the display panel and the body portion.

* * * * *